US009471289B2

(12) United States Patent
Feng et al.

(10) Patent No.: US 9,471,289 B2
(45) Date of Patent: Oct. 18, 2016

(54) COMPILER OPTIMIZATION FOR MANY INTEGRATED CORE PROCESSORS

(71) Applicant: NEC Laboratories America, Inc., Princeton, NJ (US)

(72) Inventors: Min Feng, Princeton, NJ (US); Srimat Chakradhar, Manalapan, NJ (US); Linhai Song, Madison, WI (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/667,819

(22) Filed: Mar. 25, 2015

(65) Prior Publication Data
US 2015/0277877 A1     Oct. 1, 2015

Related U.S. Application Data

(60) Provisional application No. 61/970,150, filed on Mar. 25, 2014.

(51) Int. Cl.
*G06F 9/45*     (2006.01)

(52) U.S. Cl.
CPC ............... *G06F 8/443* (2013.01); *G06F 8/433* (2013.01); *G06F 8/51* (2013.01)

(58) Field of Classification Search
CPC .......... G06F 8/433; G06F 8/51; G06F 8/443
USPC ........................................................ 717/155
See application file for complete search history.

(56) References Cited

U.S. PATENT DOCUMENTS

| | | | | |
|---|---|---|---|---|
| 6,813,701 B1* | 11/2004 | Ansari | ................ | G06F 9/30043 712/4 |
| 7,840,914 B1* | 11/2010 | Agarwal | ................ | G06F 8/451 716/102 |
| 8,893,103 B2* | 11/2014 | Ravi | .................. | G06F 8/33 717/151 |
| 2008/0229298 A1* | 9/2008 | O'Brien | ............... | G06F 8/456 717/160 |
| 2009/0248985 A1* | 10/2009 | Ayguade | ............... | G06F 8/4442 711/125 |

(Continued)

FOREIGN PATENT DOCUMENTS

CN      103440229 A   * 12/2013

OTHER PUBLICATIONS

McKinley "A Compiler Optimization Algorithm for Shared-Memory Multiprocessors", Jul. 1998, IEEE.*

(Continued)

*Primary Examiner* — Wei Zhen
*Assistant Examiner* — Junchun Wu
(74) *Attorney, Agent, or Firm* — Joseph Kolodka

(57) ABSTRACT

Systems and methods for source-to-source transformation for compiler optimization for many integrated core (MIC) coprocessors, including identifying data dependencies in candidate loops and data elements used in each iteration for arrays, profiling candidate loops to find a proper number m, wherein data transfer and computation for m iterations take an equal amount of time, and creating an outer loop outside the candidate loop, with each iteration of the outer loop executing m iterations of the candidate loop. Data streaming is performed by determining optimum buffer size for one or more arrays and inserting code before the outer loop to create optimum sized buffers, overlapping data transfer between central processing units (CPUs) and MICs with the computation; reusing buffers to reduce memory employed on the MICs, and reusing threads on MICs to repeatedly launch kernels on the MICs for asynchronous data transfer.

17 Claims, 4 Drawing Sheets

(56) References Cited

U.S. PATENT DOCUMENTS

| | | | | |
|---|---|---|---|---|
| 2009/0249318 A1* | 10/2009 | Ayguade | ............... | G06F 8/4442 717/151 |
| 2009/0254895 A1* | 10/2009 | Chen | ..................... | G06F 8/4442 717/161 |
| 2010/0023932 A1* | 1/2010 | Eichenberger | ........ | G06F 8/4442 717/160 |
| 2010/0088673 A1* | 4/2010 | Chen | ..................... | G06F 8/4442 717/110 |
| 2013/0055225 A1* | 2/2013 | Ravi | ..................... | G06F 8/4441 717/150 |
| 2014/0053131 A1* | 2/2014 | Ravi | ......................... | G06F 8/33 717/110 |

OTHER PUBLICATIONS

Li et al. "Co-processing SPMD computation on CPUs and GPUs cluster", 2013, IEEE.*
Fujii et al. "Data Transfer Matters for GPU Computing", 2013, IEEE.*
Ravi et al. "Apricot: An Optimizing Compiler and Productivity Tool for x86-compatible Many-core Coprocessors", Jun. 2012, ACM.*
Krishnaiyer et al. "Compiler-based Data Prefetching and Streaming Non-temporal Store Generation for the Intel Xeon Phi Coprocessor", 2013, IEEE.*
Mudalige et al. "Design and Initial Performance of a High-level Unstructured Mesh Framework on Heterogeneous Parallel Systems", Aug. 20, 2013, Journal of Parallel Computing.*
Zhang, et al., "On-the-Fly Elimination of Dynamic Irregularities for GPU Computing", ASPLOS, Mar. 2011, pp. 369-373.
Lee, et al., "OpenMP to GPGPU: A Compiler Framework for Automatic Translation and Optimization", PPoPP Feb. 2009, 10 Pages.
Baskaran, et al., "Automatic C-to-CUDA Code Generation for Affine Programs", Compiler Construction, Lecture Notes in Computer Science, Mar. 2010, pp. 244-263, vol. 6011.
Ravi, et al., "Apricot: An Optimizing Compiler and Productivity Tool for x86-compatible Many-core Coprocessors", ICS, Jun. 2012, 11 Pages.
Bondhugula, et al., "A Compiler Framework for Optimization of Affine Loop Nests for GPGPUs", ICS, Jun. 2008, 10 Pages.
Zhang, et al. "Optimizing Data Layouts for Parallel Computation on Multicores", International Conference on Parallel Architectures and Compilation Techniques, Oct. 2011, pp. 143-154.
Yang, et al., "A GPGPU Compiler for Memory Optimization and Parallelism Management", PLDI, Jun. 2010, pp. 86-154.

* cited by examiner

COMPILER OPTIMIZATION FOR MANY INTEGRATED CORE PROCESSORS

RELATED APPLICATION INFORMATION

This application claims priority to provisional application Ser. No. 61/970,150, filed on Mar. 25, 2014, incorporated herein by reference.

BACKGROUND

1. Technical Field

The present invention relates to a system and method for compiler optimization, and more particularly, to compiler optimizations for manycore processors.

2. Description of the Related Art

Manycore accelerators (e.g., manycore coprocessors) are being increasingly used for high performance computing. For example, 54 of the top 500 supercomputers are powered by manycore accelerators on the new list released in June 2013, which is a fourfold increase compared with two years ago. Since the massive parallel architectures of manycore accelerators can support running hundreds and thousands of threads in parallel, they can provide order of magnitude better performance and efficiency for parallel workloads as compared to multicore CPUs.

Although manycore accelerators have the ability to provide high performance, achieving performance on them remains a challenging issue. It usually requires very high expertise and effort from programmers to understand and make good use of the underneath architectures. For example, to develop high performance GPU applications, programmers need to be aware of the memory hierarchy and the warp-based thread organization, given their dominant impact on performance. Many static and runtime techniques have been developed to relieve the optimization burden from programmers for developing GPU applications. However, there is still a significant performance gap between compiler optimized code and highly tuned CUDA code.

SUMMARY

A method for source-to-source transformation for compiler optimization for one or more many integrated core (MIC) coprocessors to hide data transfer overhead between one or more central processing units (CPUs) and the MICs with the computation. Data dependencies in one or more candidate loops and data elements used in each iteration are identified for one or more arrays. The one or more candidate loops are profiled to find a proper number m, wherein data transfer and computation for m iterations take an equal amount of time. An outer loop outside the candidate loop is created, wherein each iteration of the outer loop executes m iterations of the candidate loop. Data streaming is performed, and the data streaming includes determining optimum buffer size for one or more arrays and inserting code before the outer loop to create one or more optimum sized buffers, overlapping data transfer between the CPUs and MICs with the computation, reusing the buffers to reduce memory footprint employed on the MICs during the data transfer, and reusing threads on the MICs to avoid repeatedly launching kernels on the MICs for asynchronous data transfer.

A method for source-to-source transformation for compiler optimization for one or more many integrated core (MIC) coprocessors, including regularizing irregular memory accesses in a candidate loop by reordering computations and adjusting array accesses according to the regularized irregular array structures to enable data streaming on the one or more MICs during data transfer and vectorization during computation. All irregular array accesses in a candidate loop that do not use a loop index i as an array index are identified, irregular array accesses are regularized automatically, with array indices employed in all memory access being set to the loop index i, and regularization overhead is hidden by overlapping regularization with the data transfer and the computations when data streaming is employed.

A system for source-to-source transformation for compiler optimization for one or more many integrated core (MIC) coprocessors, including an identification module configured to identify data dependencies in one or more candidate loops and data elements used in each iteration for one or more arrays; a profiling module configured to profile the one or more candidate loops to find a proper number m, wherein data transfer and computation for m iterations take an equal amount of time; and a loop creation module configured to create an outer loop outside the candidate loop, wherein each iteration of the outer loop executes m iterations of the candidate loop. A data streaming module is employed to perform data streaming, wherein the data streaming includes determining optimum buffer size for one or more arrays and inserting code before the outer loop to create one or more optimum sized buffers; overlapping data transfer between one or more central processing units (CPUs) and the MICs with the computation to hide data transfer overload; reusing the buffers to reduce memory employed on the MICs during the data transfer; and reusing threads on the MICs to repeatedly launch kernels on the MICs for asynchronous data transfer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
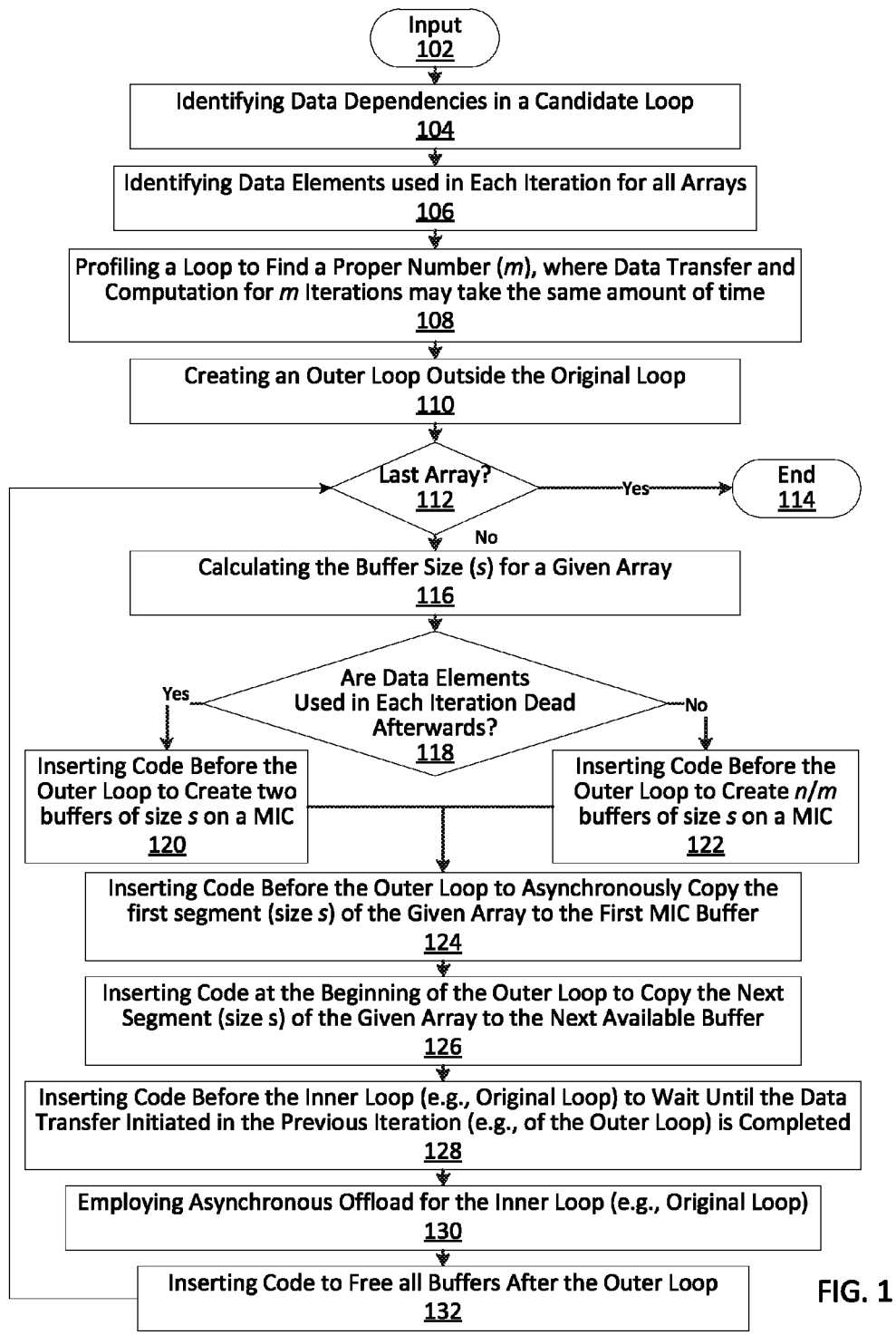
FIG. 1 is a block/flow diagram illustratively depicting a system/method for compiler optimization by automatically applying data streaming to MIC code to reduce data transfer overhead is shown in accordance with the present principles.

In accordance with the present principles, systems and methods are provided for automatically optimizing performance on Many Integrated Core Coprocessors (MICs) (e.g., Intel® Xeon® Phi Coprocessors).

It has been shown that achieving good performance on MICs (e.g., Intel® Xeon® Phi Coprocessors) is not a straightforward task for programmers. For example, one may compare the speedups of a set of Open Multi-Processing (OpenMP™) benchmarks on a multicore central processing unit (CPU) and an Intel® Xeon® Phi Coprocessors, with all speedups are normalized to the CPU versions. These codes are intrinsically parallel with minimal communication and expected to have high performance on manycore processors. The parallel performance on the CPU may be measured using 4-6 threads, while the Intel® Xeon® Phi Coprocessors performance may be measured using 200 threads.

In this situation, the Intel® Xeon® Phi Coprocessors performs poorly for eight many benchmarks, as compared to the CPU. For some of the benchmarks, the Xeon Phi performance is even worse than the sequential performance on the CPU. This shows that simply parallelizing the codes using OpenMP™ programs does not give increased performance on the Intel® Xeon® Phi Coprocessors. Given the significant parallelism the codes have and the conventional optimizations (e.g., blocking, vectorization, and array-of-structures to structure-of-array conversion) the Intel® compiler has done, it is shown that achieving performance on manycore accelerators such as the Intel® Xeon® Phi processor requires more optimizations specific to the new architecture. Furthermore, since the manycore architectures are evolving rapidly, the present principles may be applied to solve the optimization problem by using a compiler to automatically perform the optimizations while letting programmers focus on parallelism extraction.

The present principles may be employed to solve performance issues (e.g., for programs offloaded onto MICs (e.g., Intel® Xeon® Phi coprocessors)). For illustration purposes, three performance issues for programs offloaded onto MICs which the compiler optimizations according to the present principles may solve will be discussed. The compiler optimizations may improve program performance and memory utilization on the accelerators. Although the optimizations are presented in the context of Intel® Xeon® Phi coprocessors, the techniques can also be applied to other emerging manycore accelerators (e.g., Tilera Tile-Gx processors).

In one embodiment, the first optimization, data streaming, is may reduce the overhead of transferring data between the CPU and coprocessor, which often takes a large portion of the total execution time. The optimization may automatically overlap the data transfer with the computation to hide the data transfer overhead. A compiler technique according to the present principles may be to divide each parallel loop into blocks to make the computation time and data transfer time equal (e.g., to determine and/or set a proper buffer size), which may maximize the performance while minimizing the device memory usage. The threads on the accelerator may be reused to reduce the overhead of launching kernels.

In one embodiment, the second optimization, regularization, may handle loops with irregular memory accesses, which usually show poor performance on the accelerators. The optimization may rearrange the ordering of computations to regularize the memory accesses in a loop. It may enable data streaming and vectorization for the manycore accelerators in the presence of irregular memory accesses. It also may improve the cache locality, relieving any memory bandwidth bottlenecks.

In another embodiment, current data transfer mechanisms do not work efficiently for large pointer-based data structures. Many applications that use such data structures cannot benefit from the use of accelerators. However, a new shared memory mechanism to support efficiently transferring large pointer-based data structures between the CPU and the coprocessor may be established by employing the present principles. In one embodiment, the memory allocation scheme may optimize the memory usage on the accelerator. An augmented design of pointers may be introduced for fast translating pointers between their CPU and accelerator memory addresses.

The compiler optimizations according to the present principles may be implemented as source-to-source transformations using, for example, an Apricot compiler, which is a source-to-source compiler that may automatically identify offloadable code regions, and may insert offload primitives. In one embodiment, the code transformations according to the present principles may be performed at the Abstract Syntax Tree (AST) level, and codes may be parsed into AST trees using, for example, pycparser, according to one embodiment. Experimental results show that the optimizations according to the present principles may improve the performance of many benchmarks (e.g., PAR, SEC, Phoenix, NAS, Rodinia). Overall, the optimizations according to the present principles may improve the MIC performance by 1.63x-70.33x.

In one embodiment, the performance of one or more sets of benchmarks (e.g., OpenMP™) on machines equipped with one or more Intel® Xeon® Phi processors may be diminished and/or run-time errors may result when directly executing OpenMP™ parallel loops on coprocessors. The root causes of these issues may be data transfer time between the CPU and the coprocessor, irregular memory accesses, and/or limited shared memory space between the CPU and the coprocessors.

In one embodiment, novel compiler systems and methods according to the present principles may be employed to solve these issues. These systems and methods may improve the accelerator performance and enable the execution of the computation tasks that cannot be executed on the accelerators using conventional systems/methods. The compiler methods also reduce the expertise and effort required for programming the accelerators. Although the techniques are described in the context of the Intel® Xeon® Phi coprocessor, it is noted that they may also be applied to other manycore accelerators.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Prior to discussing various embodiments of the present principles in detail, some background on MIC architecture (e.g., Intel® MIC architecture) used by Intel® Xeon® Phi coprocessors. The Intel® MIC Architecture is designed to enable high levels of thread and Single Instruction, Multiple Data (SIMD) parallelism. The most recent Xeon Phi processor contains 61 cores connected through a ring bus. Each core is a modified first-generation Pentium processor that supports 4 simultaneous threads. Since one core is reserved for the OS use, the user application can use up to 240 simultaneous threads in total. While the single thread performance of Intel® MIC is worse than that of the modern CPUs, it provides more scalable performance for parallel applications.

To further increase the parallelism, Intel® MIC supports 512-bit SIMD operations. Vectorization is thereby a key to achieve performance. All cores in the Intel® MIC Architecture may share an 8 GB shared memory with coherence L2 cache. Therefore, the memory management is similar to that on the CPU. However, because Intel® MIC as a coprocessor may have no disk to access, it may have no swap space and thus may not switch out unused memory pages. More efficient memory usage is required to run the applications that have big memory footprints. Since the Intel® MIC Architecture is x86 compatible, it supports standard programming languages such as fortran and C/C++ and can run legacy CPU code. It can also utilize existing parallelization tools for CPUs.

It is noted that the coprocessors may employ an offload mode. Applications may have a significant portion of serial code. The serial code is usually best executed on a modern CPU, which has a higher clock speed and a more advanced architecture. Only the highly-parallel code region of an application is offloaded from the CPU to the coprocessors to achieve more scalable performance. In the offload mode, an application is always started on the CPU. Once the execution gets into a parallel code region, it copies the parallel code and input data from the CPU to the coprocessor through the PCI-E bus and then executes the parallel code on the coprocessors. After the parallel code region is done, the output data may be copied back from the coprocessor to the CPU and the execution may continue on the CPU.

Intel® provides Language Extension for Offload (LEO) for programming the offload mode. It is a set of high-level directives designed to improve the programmer productivity. When using LEO, programmers can choose which code to offload and need to specify the input and output data for the offloaded code regions. Pseudocode 1, below, shows a LEO code example extracted from the Blackscholes benchmark. The offloaded code region is a loop parallelized with OpenMP™ pragmas. An offload pragma is inserted before the loop to specify the offloaded code region. The target clause gives the target coprocessor where the code will be offloaded. In this case, it is the first MIC device. The in and out clauses is used to declare the input and output data for the offloaded code region.

Pseudocode 1: LEO code example from Blackscholes benchmark

```
#pragma offload target(mic:0) \
   in(sptprice, .. .:length(numOptions))\
   out(prices:length(numOptions))
{
   #pragma omp parallel for private(i, price)
   for (i=0; i <numOptions; i++) {
      price = BlkSchlsEqEuroNoDiv(sptprice[i], . . ., 0);
      prices[i] = price;
   }
}
```

In addition to explicitly specifying the data transfer, LEO also supports an implicit data transfer model with shared memory between the CPU and the coprocessor. A runtime (e.g., MYO) may be employed to automate the procedure of transferring the shared data between the CPU and the coprocessor. Pseudocode 2, below, shows a code example using MYO. In the example, variable v marked with Cilk shared and the data allocated using Offload shared malloc is shared between the CPU and the coprocessor. The Cilk offload clause is used to offload function foo( ) to the coprocessor. The data communication of variable V only occurs at the boundary of the offloaded code region according to the MYO scheme.

Pseudocode 2: A LEO code example using shared memory between CPU and processor

```
Cilk shared int *v;
Cilk shared void foo( ) {
   for (int i = 0; i < 5; i++) {
      v[i] = i;
   }
}
int main( ) {
   int size = sizeof(int)*5;
   v = ( Cilk shared int *)Offload shared malloc(size);
   Cilk offload foo( );
   return 0;
}
```

It is noted that the present principles may be employed to significantly improve the performance of applications that offload computations to many core processors by source to source compiler optimizations according to various embodiments. Three compiler optimizations will be discussed in detail below as illustrations of the present principles.

According to one embodiment, a novel data streaming technique, which overlaps data transfer between the multi-core and manycore processors with computation on these processors to hide the data transfer overhead, may be employed according to the present principles. Optimal buffer sizes to be used on the manycore processors may be identified, and the buffers may be reused for efficient data transfer. Reuse of buffers may significantly reduce the memory used on the manycore processor for data transfers. Also, the overhead of repeatedly launching kernels on the manycore processor for asynchronous data transfers may be avoided by reusing the threads on the manycore processor according to the present principles.

In another embodiment, regularization of irregular memory accesses may be achieved by reordering computations. This may enable data streaming and vectorization on the manycore processor, even when memory access patterns in the original source code are irregular. Regularization also may improve the cache locality and may eliminate the memory bandwidth bottleneck. In another embodiment, a shared memory mechanism according to the present principles may provide efficient support for transferring large pointer-based data structures between the host and the manycore processor. The memory allocation system and method according to the present principles improves utilization of the limited memory on the manycore processor. A new method for fast translation of pointers between the multicore and manycore memory address spaces may also be employed. Experimental evaluations have shown that the compiler optimizations according to the present principles benefit at least nine out of twelve benchmarks and achieve at least 1.63x70.33x speedups over the original, parallel implementations of these benchmarks on the manycore processor.

Referring now to FIG. 1, a block/flow diagram illustratively depicting a system/method for compiler optimization by automatically applying data streaming to MIC code to reduce data transfer overhead is illustratively depicted in accordance with the present principles. In one embodiment, data streaming optimization according to the present principles may lower data transfer overhead for a set of benchmarks using a compiler transformation for data streaming and/or one or more optimizations for further reducing time and memory overhead according to the present principles.

In one embodiment, input may be received in block 102, and data dependencies may be identified in a candidate loop in block 104. Data elements used in each iteration for all arrays may be identified in block 106. A loop may be profiled in block 108 to find a proper number (m), where data transfer and computation for m iterations may take the same amount of time. An outer loop may be created outside the original loop that was profiled in block 110. If all arrays used in the original loop have been processed e.g., there are no more arrays that have not been identified and/or processed), and a last array is reached, the system/method may end in block 114. If the last array has not been reached in block 112, a buffer size (s) for one or more arrays may be calculated in block 116.

In one embodiment, if data elements used in each iteration are determined to be not used in subsequent iterations (e.g., dead afterwards) in block 118, code may be inserted before the outer loop to create two buffers of size s on one or more MICs in block 120. If data elements used in each iteration are determined to not be dead afterwards in block 118, code may be inserted before the outer loop to create n/m buffers of size s on one or more MICs in block 122.

In one embodiment, code may be inserted before the outer loop to asynchronously copy the first segment (e.g., size s) of one or more arrays to a first MIC buffer in block 124. Code may be inserted at the beginning of the outer loop to copy a next segment (e.g., size s) of one or more arrays to a next available buffer in block 126. Code may also be inserted before the inner loop (e.g., original loop) to wait until a data transfer initiated in a previous iteration (e.g., of the outer loop) has completed in block 128. In one embodiment, asynchronous offload may be employed for the inner loop (e.g., original loop) in block 130, and code may be inserted to free all buffers after the outer loop in block 132. The process may be repeated until reaching a last array in block 112.

In one embodiment, source-to-source transformation for automatically applying data streaming to MIC code may be performed according to the present principles. Data transfer may be automatically overlapped with computation to reduce the data transfer overhead, and code segments may be enabled to be executed on a MIC when an entire data set cannot be held in the memory buffer of a MIC. Buffer allocation may minimize the memory usage on a MIC while achieving much better performance than conventional systems, and data may be transferred in small blocks rather than transferring data as an entire chunk using data streaming according to the present principles.

In one embodiment, a compiler optimization, (e.g., data streaming), may automatically overlap the data transfer with computation to hide the data transfer time. In conventional systems, to execute a code region on a coprocessor, the computation begins after completion of transferring all the input data to a coprocessor. Therefore the total execution time may be the computation time plus the data transfer time. With data streaming according to the present principles, the data transfer and computation may be divided into multiple blocks and may be performed in a pipelined style. The i-th computation block, which may be a subset of continuous iterations, may start right after the i-th data block is transferred to the coprocessor and overlaps with the data transfer of (i+1)-th block. Total execution time may then be reduced to the computation time plus the data transfer time of the first block according to the present principles.

In one embodiment, code transformation for data streaming may be performed according to the present principles. For illustrative purposes, the loop described in Pseudocode 1 is employed as an example. Pseudocode 3, below, shows a transformed loop, which may overlap the data transfer of array "sptprice" (as shown in the original loop in Pseudocode 1) with the computation in the loop body (e.g., the calculation of function BlkSchlsEqEuroNoDiv( )). According to the present principles.

---

Pseudocode 3: Transformed Blackscholes loop
after applying data streaming

```
// allocate memory space on the coprocessor
#pragma offload target(mic:0) \
    nocopy(sptprice[0:numOptions] : alloc if(1) free if(0)) \
    nocopy ... \
    in(blocksize, price : alloc if(1) free if(0))
{ }
// asynchronous data transfer for the first block
#pragma offload transfer target(mic:0) \
    in(sptprice[0:blocksize] : alloc if(0) free if(0)) \
    in.. .\
    signal(psptprice)
for(k=0; k <numOptions/blocksize;k++ {
    // asynchronous data transfer for the (k+1)-th block
    if(k <numOptions/blocksize-1){
        start = (k+1) * blocksize;
        #pragma offload transfer target(mic:0) \
            in(sptprice[start:blocksize] : alloc if(0) free if(0)) \
            in. . . \
            signal(start)
    }
    // perform the k-th computation block
    start = k * blocksize;
    #pragma offload target(mic:0) wait(start) \
        out(prices[start:blocksize]: alloc if(0) free if(0) )
    #pragma omp parallel for private(i, price) \
        num threads(THREADS MIC)
    for (i=start; i <start+blocksize; i++) {
```

-continued

Pseudocode 3: Transformed Blackscholes loop
after applying data streaming

```
        price = BlkSchlsEqEuroNoDiv( sptprice [i], ...);
        prices[i] = price;
      }
    }
// free memory space on the coprocessor
#pragma offload target(mic:0) \
    nocopy(sptprice[0:numOptions] : alloc if(0) free if(1)) \
    nocopy . . . \
    nocopy(blocksize, price : alloc if(0) free if(1))
{ }
```

In one embodiment, before performing code transformation, one or more processors may be employed to determine if data streaming may be applied to a loop. When a loop is executed in the data streaming system/method, one or more computation blocks may be started when input data is ready. Therefore, to automatically apply data streaming, the compiler may identify which input data should be employed for each computation block. According to one embodiment of the present principles, data streaming may be applied only when all array indexes in the loop are in the form of a*i+b, where i is the loop index and a and b are constants. This enables simplified calculation of the data portion that is employed by one or more computation blocks. Some loops may include irregular memory accesses, (e.g., C[i]=A[B[i]]). In this case, the index of array A may depend on an element of array B. Static analysis cannot determine what element of array A is accessed in this statement. Thus, conventional compilers cannot directly divide the transfer of array A. Systems and methods to regularize this type of accesses in order to enable data streaming according to the present principles will be discussed in more detail below with reference to FIG. 2.

With respect to memory allocation and deallocation, memory may generally be allocated on the MIC to copy data to the MIC. However, with data streaming, this may cause significant time overhead since the allocation procedure may be invoked many times. To avoid this, memory allocation may be performed only once before entering the loop in one embodiment according to the present principles. For each array, MIC memory for the entire array may be allocated. For each scalar variable, its value may also be copied to the MIC at the allocation site. Similarly, all memory space may be freed after exiting the loop.

In one embodiment, with respect to loop transformation, to enable data streaming, the loop execution may be divided into blocks. To implement this, the original loop may be replaced with a two-level nested loop. The inner loop may perform a computation block (e.g., a subset of continuous iterations of the original loop). The outer loop may repeat until all computations are done. In one embodiment, data transfer and synchronization primitives may be inserted in the body of the outer loop to enable pipelined execution. In the i-th iteration of the outer loop, the data transfer of the (i+1)-th block may be started first. Then the execution of the i-th block may be offloaded to the MIC when the data transfer of the i-th block is done.

It is noted that offloading a loop onto a MIC requires properly using the MIC memory due to its limited size. The problem is complicated at least because of the lack of a directly attached disk. A MIC may simply give errors when the copied data cannot be fit in the MIC memory. For example, if a current MIC has at most 8 GB of memory available and part of that is reserved for the MIC's operating system, many applications that have large memory footprint cannot be directly offloaded to the MIC using conventional systems/methods.

In one embodiment, to solve this issue, an optimization may be employed to reduce the memory usage of data streaming according to the present principles. When executing a loop in the data streaming model, MIC memory may be reserved for just two data blocks (e.g., the data block for the current and next computation block). All previous data blocks may not have be used anymore, and their memory space may be reused. This not only may reduce the memory usage on the MIC but also may enable the offload of loops with larger input data.

As compared to the above-mentioned code transformation, there may be two changes according to one embodiment of the present principles. First MIC memory may be allocated for only two data blocks for each copied array. These memory blocks may be reused throughout the loop execution. Second, the outer loop may include two parts: one for odd blocks and the other for even blocks, as shown in Pseudocode 4 below. This may transfer continuous data blocks into different memory blocks on the MIC. In the loop example, all even data blocks of array sptprice may be stored in spt-price block1 and all odd data blocks may be stored in sptprice block2. The two memory blocks may be reused for entire array sptprice.

Pseudocode 4: Optimized Blackscholes loop
with reduced memory usage

```
for(k=0; k <numOptions/blocksize; k++) {
    if(k%2==0) { // handle the even blocks
        // asynchronous data transfer for the (k+1)-th block
        if(k <numOptions/blocksize-1) {
            start = (k+1) * blocksize;
            #pragma offload transfer target(mic:0) \
                in(sptprice[start:blocksize]: into(sptprice
                block2[0:blocksize]) alloc if(0) free if(0)) \
                . . .\
                signal(start)
        }
        // perform the k-th computation block
        start = k * blocksize;
        #pragma offload target(mic:0) wait(start) \
            in(blocksize, price) \
            out(prices block:length(blocksize) into(prices
            [start:blocksize]) alloc if(0) free if(0) )
        #pragma omp parallel for private(i, price) num
        threads(THREADS MIC)
        for (i=0; i <blocksize; i++) {
            price = BlkSchlsEqEuroNoDiv( sptprice
            block1[i], ...);
            prices block[i] = price;
        }
    else { // handle the odd blocks
        . . .
    }
}
```

In one embodiment, a proper block size may be chosen, as discussed in detail below. Choosing a proper block size (e.g., number of iterations in a computation block) is critical to the loop performance on the MIC. A larger block size may reduce the overhead of launching kernels but may increase the initial data transfer time. A smaller block size may save the initial data transfer time but many of kernels may be launched.

In one example, if given a loop, the total data transfer time may be assumed to be D, the total computation time may be assumed to be C, the overhead of launching a kernel may be assumed to be K, and the loop may be split into N blocks.

Without data streaming, the total loop execution time may be D+K+C. With data streaming, the total execution time may be calculated by using D/N+max{C/N+K, D/N}*(N−1)+(C/N+K), where D/N is the data transfer time for the first block, (C/N+K) is the computation time for the last block, and max{C/N+K, D/N} is the execution for any other block. When C/N+K>D/N, the N value to minimize the equation may be sqrt(D/K). When C/N+K≤D/N, the best N value may be (D−C)/K. In performing experiments, it has been found that an optimum number of blocks for most benchmarks may be between 10 and 20.

It is noted that conventional LEO support for asynchronous data transfer and offload requires a kernel to be launched for each offload. The overhead of launching kernels can be significant, especially if the same kernel is launched for many times. Optimizations according to the present principles may reduce this overhead.

In one embodiment, MIC threads may be reused. Since the overhead of launching kernels may be high, the MIC threads may be reused to avoid repeated launches of the same kernels. The conventional Intel® LEO does not provide support for reusing the MIC threads. To reuse the MIC threads according to the present principles, only one loop kernel may be launched using asynchronous offload. While the kernel may start on the MIC, the CPU may continue to transfer the next data block onto the MIC in parallel. The kernel may not end after the computation block is done. Instead, it may wait for the next data block. The CPU may send the MIC a signal when the next data block is ready. Once receiving the signal, the kernel on the MIC may continue to perform the next block. The kernel may exit when the entire loop is done. In one embodiment, a lower-level COI library may be employed to control the synchronization between the CPU and MIC.

In one embodiment, offloads may be merged according to the present principles. In many applications (e.g., streamcluster), there may be multiple offloads in a large loop, as shown in Pseudocode 5 below. By applying data streaming to each individual offload, significant overhead may be caused for launching kernels. To reduce the overhead, small offloads may be merged into a single large offload. In other words, instead of offloading the smaller inner loops, the larger outer loop is offloaded. Although the sequential execution on the MIC may increase by doing this, the kernel launching overhead is advantageously greatly reduced.

---

Pseudocode 5: Multiple offloads inside a streamcluster loop

---

```
for(i=0; i <iter;i++) {
  ...
  #pragma offload target(mic:0)
  ...
  #pragma offload target(mic:0)
  ...
  #pragma offload target(mic:0)
  ...
}
```
---

It is noted that while the above embodiments and applications are discussed in detail above, it is contemplated that other sorts of embodiments and applications may also be applicable to the systems and methods according to the present principles.

Figure 2:
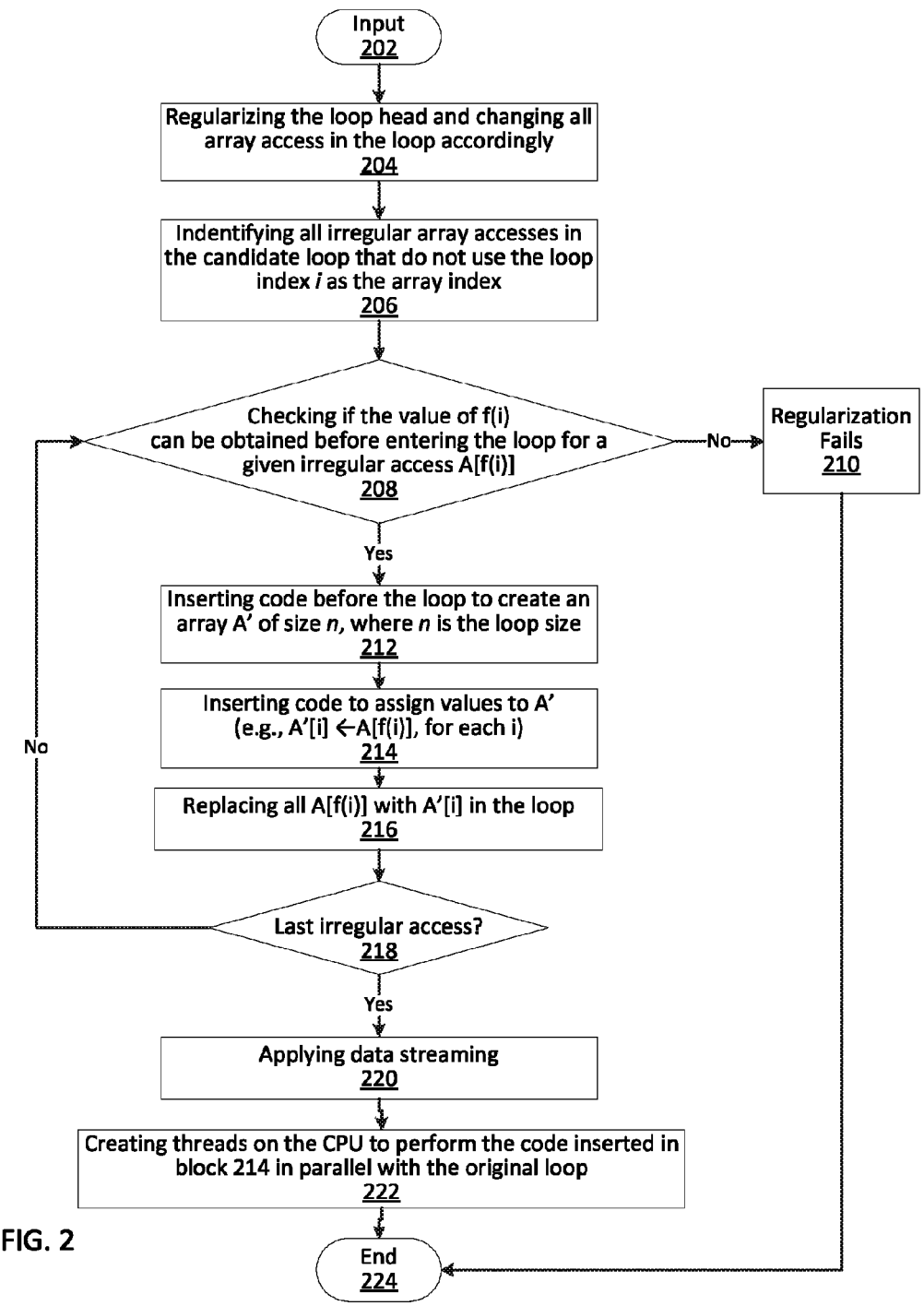
FIG. 2 is a block/flow diagram illustratively depicting a system/method for compiler optimization by automatically rearranging ordering of computations is shown in accordance with the present principles.

Referring now to FIG. 2, a block/flow diagram illustratively depicting a system/method for compiler optimization by automatically rearranging ordering of computations to enable vectorization and data streaming for MICs including irregular memory access patterns is illustratively depicted in accordance with the present principles. In one embodiment, regularization of irregular memory accesses may be performed according to the present principles. It is noted that in real applications, loops may include irregular memory accesses.

Pseudocode 6 below shows an example from benchmark srad. Each iteration of the inner loop reads array J and writes to array dN, dS, dW, and dE. In the expressions, the index of array J depends on the values of array iN, iS, W, and E. It is noted that data streaming cannot be directly applied here since the accesses to array J are not continuous and the mapping from array elements (e.g., of J) to iterations is unknown at the compile time.

This irregular access pattern may also prevent many other compiler optimizations (e.g., automatic vectorization) from working properly. Vectorization is critical to the MIC performance since the MIC may provide, for example, 512-bit wide SIMD units. In addition, irregular accesses often increase the data transfer time since many elements in an array may not be accessed. Finally, it may decrease the cache performance due to lack of space locality.

In one embodiment, input may be received in block 202. A loop head may be regularized, and all array access in a loop may be adjusted accordingly in block 204. One or more irregular array accesses that do not use a loop index i as an array index may be identified in a candidate loop in block 206. The present principles may be employed to determine whether the value of f(i) may be obtained before entering a loop for a given irregular access A[f(i)] in block 208. If no, then regularization fails in block 210, and the process may end in block 224. If yes, then code may be inserted before the loop to create an array A' of size n in block 212. Code may then be inserted to assign values to A' in block 214, and all A[f(i)] may be replaced with A' [i] in the loop in block 216.

It may be determined in block 218 whether a last irregular access has been reached. If no, the process continues by again determining whether the value of f(i) may be obtained before entering a loop for a given irregular access A[f(i)] in block 208. If yes, data streaming may be applied in block 220, threads may be created on a central processing unit (CPU) to perform the code inserted in block 214 in parallel with the original loop in block 222. Then the process may end in block 224.

In one embodiment, there may be, for example, a loop as follows:

In block 204:

---

```
for(i=begin; i<end; i=i+stride) {
  sum+= A[i];
}
```
---

After regularization, the loop may become as follows:

---

```
for(i=0; i<(end-begin)/stride; i=i+1)
  sum+=A[i*stride+begin];
}
```
---

In block 208, the value of f(i) can be obtained beforehand if all valuables (except i) used in f(i) are not modified from iteration 0 to i−1.

One embodiment according to the present principles may be employed to regularize the irregular memory accesses in a loop for improved MIC performance. It is noted that an irregular memory access in a loop may be defined as an access that does not access elements continuously across iterations. The regularization procedure according to the present principles may transform the access so that it accesses continuous elements across iterations. There are several common patterns of irregular accesses, examples of which will be discussed in further detail below.

In one embodiment, reordering of arrays may be performed according to the present principles. Pseudocode 6, below, shows two common irregular access patterns. In the first loop, the index of array A may be a value in array B. This may disable data streaming and vectorization. In the second loop, the loop stride may be a constant larger than 1, which is common in benchmark nn. Since many elements may not be used in the loop, transferring the entire array A may cause unnecessary data transfer and may also hurt the cache performance. The two loops may be handled in the same way after the loop head is regularized (e.g., converting the loop stride to 1).

In both instances discussed above, the array index may be an expression that may be composed of constants and variables calculated before the loop. Since the variables in the expression may be unchanged in the loop, the expression (e.g., the array index) may be evaluated outside the loop. To regularize the loop, a new array, which is a permutation of the original array A, may be created, as shown in Pseudocode 6. The elements in the new array may be sorted according to the access order in the loop. By replacing the original array with the new array, all accesses in the loop may be regularized.

Pseudocode 6: Two examples of irregular memory access patterns (a): Irregular access patterns
```
// loop A
for(i=0; i <N; i++)
    task(A[B[i]]);
// loop B
for(i=0; i <N; i++)
    task(A[i]);
```
(b): Regularized Loops
```
// loop A
for(i=0; i <N; i++)
    A'[i] = A[B[i]];
for(i=0; i <N; i++)
    task(A'[i]);
// loop B
for(i=0; i<N; i+=1)
    A'[i] = A'[i*10];
for(i=0; i<N; i+=1)
    task(A'[i]);
```

In one embodiment, splitting of loops may be performed according to the present principles. In real applications, loops may perform irregular memory accesses at the beginning of each iteration. For example, as shown in Pseudocode 7 below, after the irregular access to array J, the rest of the accesses may all be regular. In this example, since only parallel loops are being considered (e.g., no cross-iteration dependences in the loops), the irregular memory access may be safely split from the rest of the loop body in this case. Pseudocode 8, below, shows the transformed srad loop after splitting, where all irregular accesses are performed in the first loop and make the second loop regular. After splitting the loop, data streaming and vectorization may be applied to the second loop according to the present principles.

Pseudocode 7: Irregular memory accesses in benchmark srad

```
for (i = 0 ; i < rows ; i++) {
    for (j = 0; j < cols; j++) {
        k = i * cols + j;    Jc = J[k];
        // irregular memory accesses dN[k]
        = J[iN[i] * cols + j] - Jc;
        dS[k] = J[iS[i] * cols + j] - Jc;
        dW[k] = J[i * cols + j * W[ j]] - Jc;
        dE[k] = J[i * cols + j * E[j]] - Jc;
        // the rest calculations
        G2 = (dN[k]*dN[k] + dS[k]*dS
             [k] \ + dW[k]*dW[k] + dE[k]*
             dE[k]) / (Jc*Jc);
        L = (dN[k] + dS[k] + dW[k] +
            dE[k]) / Jc;
        ...
        ...
    }
}
```

Pseudocode 8: Transformed irregular loop from benchmark srad after splitting

```
for (i = 0 ; i < rows ; i++) {
    for (j = 0; j < cols; j++) {
        k = i*cols + j;
        Jc = J[k];
        // irregular memory accesses
        dN[k] = J[iN[i] * cols + j] - Jc;
        dS[k] = J[iS[i] * cols + j] - Jc;
        dW[k] = J[i * cols + j * W[j]] - Jc;
        dE[k] = J[i * cols + j * E[j]] - Jc;
    }
for (i = 0 ; i < rows ; i++) {
    for (j = 0; j < cols; j++) {
        // the rest calculations
        G2 = (dN[k]*dN[k] + dS[k]*dS
             [k] \ + dW[k]*dW[k] + dE[k]*
             dE[k]) / (Jc*Jc);
        L = (dN[k] + dS[k] + dW[k] +
            dE[k]) / Jc;
        ...
        ...
    }
}
```

In one embodiment, the present principles may be applied to arrays of structures. For example, Pseudocode 9 below shows another common irregular access pattern. The accesses may not be continuous because each array element may be a structure. Regularization may be performed by converting arrays of structures to structures of arrays according to the present principles.

Pseudocode 9: Array of structures

```
for (i = 0; i < N; i++ {
    B[i].a = task(A[i].a);
    B[i].b = task(A[i].b);
    B[i].c = task(A[i].c);
}
```

In one embodiment, pipelining regularization with data transfer and computation may be performed according to the present principles. After regularization, data streaming may be applied to the loop. To save the regularization overhead, regularization may be done in parallel with data transfer and computation. More specifically, the regularization of block i+2 can be done in parallel with the data transfer of block i+1 and the computation of block i. The only extra overhead caused by regularization may be the time for regularizing the first data block.

It is noted that while the above embodiments and applications are discussed in detail above, it is contemplated that other sorts of embodiments and applications may also be applicable to the systems and methods according to the present principles.

Figure 3:
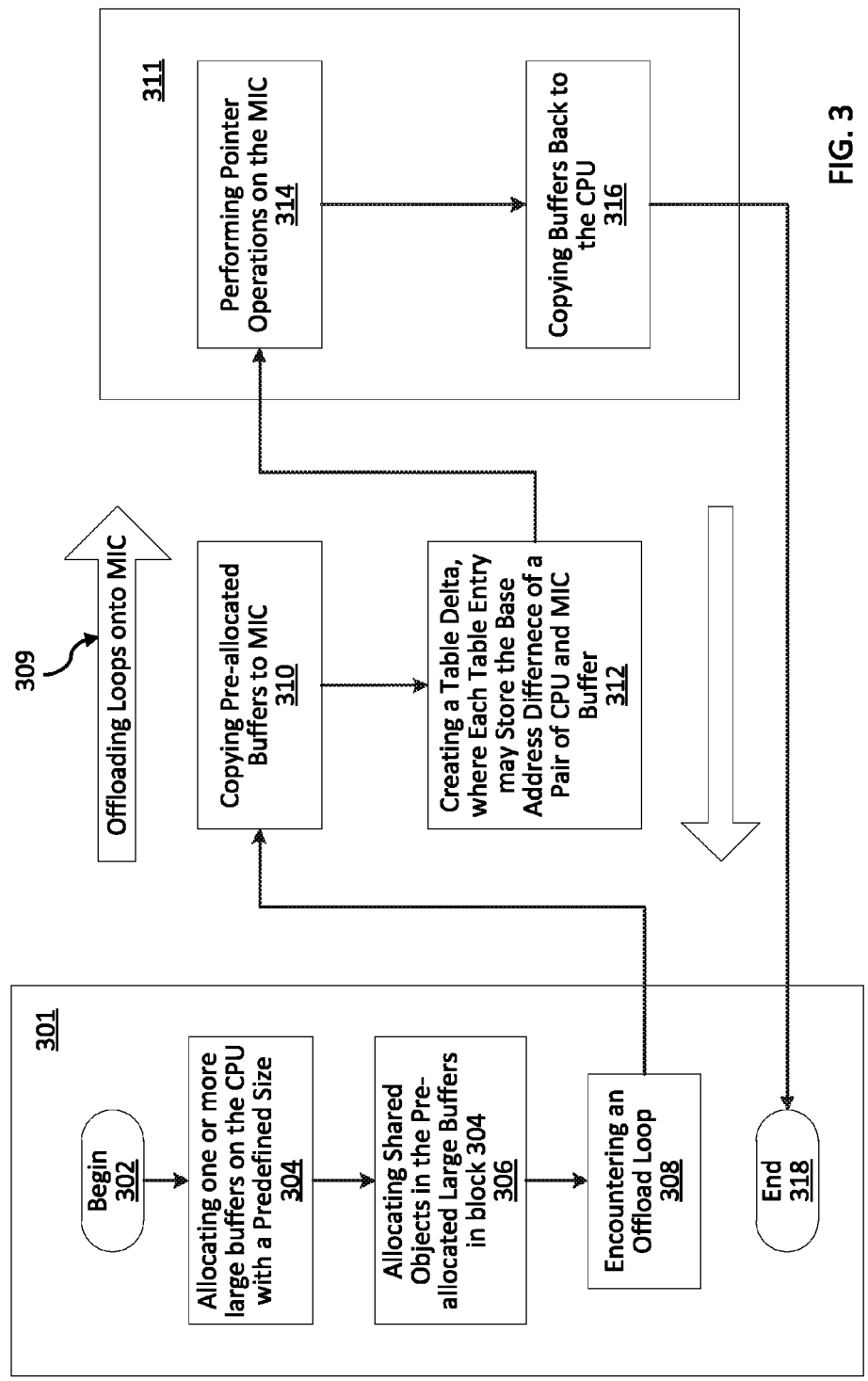
FIG. 3 is a block/flow diagram illustratively depicting a system/method for compiler optimization by using a shared memory mechanism for transferring large pointer based data structures between a CPU and a MIC is shown in accordance with the present principles in accordance with the present principles.

Referring now to FIG. 3, a block/flow diagram illustratively depicting a system/method for compiler optimization using a shared memory mechanism for transferring large pointer based data structures between a CPU and a MIC is illustratively depicted in accordance with the present principles. In one embodiment, input may be received in block 302 on the CPU side 301, and one or more large buffers with a predefined size (e.g., 200 MB or larger) may be allocated on a CPU in block 304. Shared objects used in the original code may be allocated in the preallocated large buffers in block 306, and if an offload loop is encountered, loops may be offloaded onto one or more MICs 309 by copying pre-allocated buffers to the one or more MICs in block 310, and creating a table delta where each table entry may store the base address difference of a pair of CPU and MIC buffer in block 312. Pointer operations may be performed on the MIC in block 314 on the MIC side 311. Buffers may be copied back to the CPU in block 316, and the process may complete in block 318 according to one embodiment of the present principles.

In one embodiment, a shared memory mechanism for transferring large pointer-based data structures between the CPU and the MIC according to the present principles may enable Direct Memory Access (DMA) for transferring pointer-based data structures between the CPU and MIC. Memory utilization may be improved when pointer-based data structures are employed. In other words, when a data structure is small, most memory space may be left on the MIC for other use. When a data structure is large, all, or nearly all of the MIC memory space may be employed. A novel pointer implementation to enable rapid pointer translation between the CPU and MIC memory spaces may also be employed according to the present principles.

It is noted that Intel® MYO may provide shared memory abstraction to support transferring complicated data structures such as pointer-based data structures between the CPU and MIC. Pseudocode 2 shows a MYO example of a shared pointer-based data structure from benchmark ferret. Keyword Cilk shared is used to annotate a shared object or pointer. The current MYO may implement the virtual shared memory using a scheme similar to page fault handling. Shared data structures may be copied on the fly at the page level. When a shared variable is accessed on the MIC, its entire page is copied to the MIC memory. The scheme is very slow when copying a large data structure. This is because the page granularity is too small for a large data structure. Direct memory access (DMA) is underutilized and the large number of page faults may incur huge handling overhead in this situation. An example of a MYO with a shared data structure from benchmark ferret is shown in Pseudocode 10 below.

Pseudocode 10: MYO example of shared
data structure from benchmark ferret

Cilk shared struct cass table {
    Cilk shared struct cass env t *env;
    Cilk shared void*  private;

Pseudocode 10: MYO example of shared
data structure from benchmark ferret

Cilk shared cass vecset cfg t *cfg;
Cilk shared cass map t * map;
Cilk shared Array TYPE(struct
    cass table *) children;
. . .
} cass table t;

In one embodiment, when employing the present principles, data transfer with larger granularity can greatly improve the performance when the loop is dealing with a large data structures. The present principles may be employed to improve the performance of data transfer for a large pointer-based data structure. As shown in Pseudocode 10 below, the present principles may pre-allocate large buffers for holding the shared data structure. Data objects may be created continuously in the preallocated buffers. When offloading a loop using the data structure, the entire data structure (e.g., the entire pre-allocated buffers) may be copied to the MIC memory. When a shared object is accessed on the MIC, the system/method according to the present principles does not need to check its state since the entire data structure has been copied to the MIC memory. Therefore, the accesses to shared objects using the present principles is faster than MYO. Furthermore, the present principles may make full use of DMA since the data may be transferred in larger chunks.

Advantages of embodiments of the present principles will be illustratively depicted in reference to solving two challenges for simplicity of illustration: how the buffers may be pre-allocated to minimize memory usage on the MIC, and how the links between objects may be preserved after being copied to the MIC. These solutions will be discussed in more detail below.

It is noted that an effective buffer allocation strategy should include at least two conditions: (1) The memory usage on the MIC should be minimized when the data structure is small; and (2) the entire memory space on the MIC should be able to be fully utilized when the data structure is large. The present principles may employ a novel buffer allocation strategy which includes creating one or more sets of separate buffers. More specifically, one buffer with a predefined size may be created at the beginning. When the buffer is full, another buffer of the same size may be created to hold new objects. In this way, there exists one smaller buffer when the data structure is small. When the data structure grows larger, the entire memory space on the MIC may be fully utilized. In addition, in one embodiment according to the present principles, it is not necessary to move data when a new buffer is allocated.

In one embodiment, after a data structure is copied to the MIC memory, the links between objects may be preserved to ensure the correctness of the loop execution. The de-referencing of the pointers on the MIC is a challenging problem since the CPU and MIC may have two separate memory spaces. The situation may become increasingly complicated because of the discontinuous buffers that may be employed according to the present principles.

In one embodiment, since the program may start on the CPU, all pointers may initially store CPU memory addresses. For simplicity of illustration, all shared pointers may be restricted (e.g., the pointers annotated with Cilk shared) to storing CPU memory addresses throughout the execution, even on the MIC. Then, when a shared pointer is de-referenced after the data structure is copied to the MIC, the CPU memory address may be mapped to the corresponding MIC memory address. In one embodiment, to do so, when the buffers that contain the data structure are copied to the MIC memory, a table delta may be created. The table size may be the number of buffers we have copied to the MIC. Each table entry may store the base address difference of two corresponding buffers (e.g., one on the CPU and the other on the MIC). When a shared pointer on the MIC is de-referenced, it may first be identified which buffer to which the pointer points, and then the corresponding home address difference may be added to the pointer value.

Figure 4:
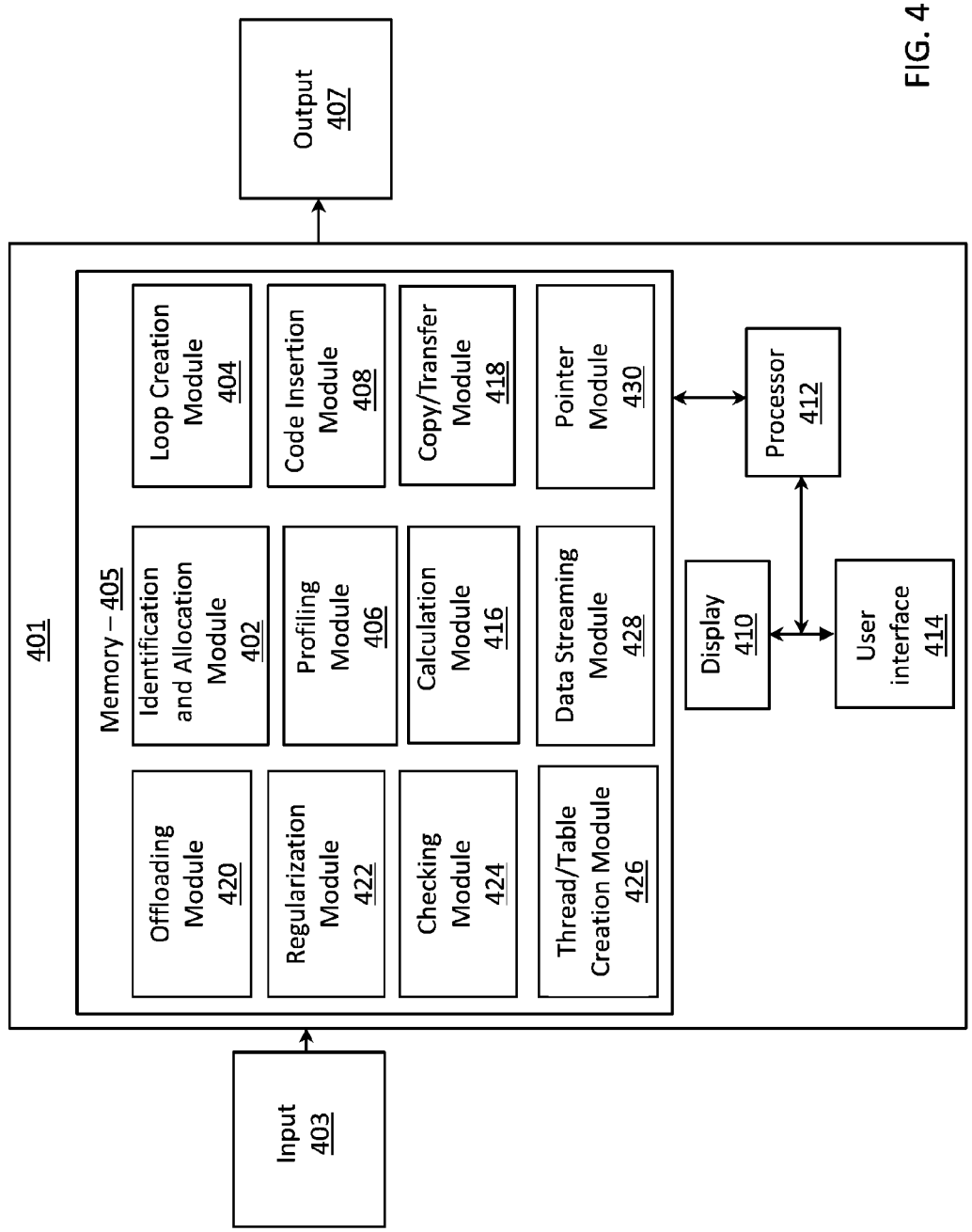
FIG. 4 is a block/flow diagram illustratively depicting a system/method for compiler optimization is shown in accordance with the present principles.

It is noted that identifying the buffer a pointer points to based on its value is costly. It involves a set of comparison operations with the worst time complexity linear to the number of buffers. To fast locate the pointed buffer, we add a 1-byte field bid to each pointer and object annotated with Cilk shared. The bid field of a pointer stores the ID of the pointed buffer while the bid field of an object stores the ID of the buffer it is located in. With this augmentation, we can directly get the buffer ID from a pointer's bid field when it is being dereferenced. The bid field of an object is assigned when it is created. Table 3 summarized the pointer operations on the CPU and MIC Referring now to FIG. 4, with continued reference to FIGS. 1-3, a system/method for compiler optimization is illustratively depicted in accordance with the present principles. The system 401 may include a workstation or other system. The system 401 may be a general purpose, or special purpose computer, and preferably includes one or more processors and/or coprocessors 412 and memory 405 for storing applications, modules, and other data.

In one embodiment, the system 401 may include one or more displays 410 for viewing. The displays 410 may permit a user to interact with the system 401 and its components and functions. This may be further facilitated by a user interface 414, which may include a mouse, joystick, or any other peripheral or control to permit user interaction with the system 401 and/or its devices. It should be understood that the components and functions of the system 401 may be integrated into one or more systems or workstations.

In one embodiment, the system 401 may receive input in block 403 according to the present principles. Data dependencies in a candidate loop, data elements used in each iteration for all arrays may be identified, and memory and/or buffers may be allocated using the identification and allocation module 402, as discussed above in reference to FIGS. 1-3. One or more loops may be created using the loop creation module 404, and one or more loops may be profiled (e.g, to find a proper number (m) where data transfer and computation for m iterations may take the same amount of time) using a profile module 406. Code may be inserted using a code insertion module 408, as discussed above in reference to FIGS. 1-3, and a calculation module 416 may be employed to calculate a one or more buffer sizes for an array. In one embodiment, an offloading module 420 may be employed for offloading to, for example, MICs and/or CPUs, and output 407 may be produced and/or sent in accordance with the present principles.

In one embodiment, input 403 may be received, and one or more loop heads may be regularized, and some or all array access in the loop may be changed accordingly using a regularization module 422. Some or all irregular array accesses in a candidate loop that do not use the loop index I as the array index may be identified using an identification and allocation module 402. A checking module 424 may be employed to check if the value of f(i) may be obtained before entering a loop for one or more irregular accesses A[f(i)]. Code may be inserted, and some or all A[f(i)] may be replaced with A'[i] in the loop using a code insertion module 408, as discussed above in reference to FIG. 2. If a last irregular access is not encountered after the inserting and replacing, the checking, inserting, and replacing may again be performed by the checking module 424 and the code insertion module 408. If a last irregular access is encountered, then data streaming may be automatically applied using a data streaming module 428 in accordance with the present principles, as discussed above in reference to FIGS. 1-3. A thread creation module 426 may then create threads on, for example, the CPU, to perform the code inserted by the code insertion module 408 in parallel with the original loop according to the present principles.

In one embodiment, a transfer module 418 may be employed to transfer large pointer-based data structures between a CPU and MIC according to the present principles. One or more large buffers with predefined size may be allocated on the CPU, and shared objects may be allocated in the pre-allocated large buffers using an identification and allocation module 402. Loops may be offloaded onto MICs using an offloading module 420, and pre-allocated buffers may be copied to MICs using a copy/transfer module 418. A thread/table creation module 426 may be employed to create a table delta where each table entry may store a base address difference of a pair of CPU and MIC buffer, pointer operations may be performed using a pointer module 430, and buffers may be copied back to a CPU from a MIC using a copy/transfer module 418 in accordance with one embodiment of the present principles.

It is noted that while the above-mentioned system and modules are illustratively provided, it is contemplated that other sorts of systems and modules may also be employed according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an Appendix to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for source-to-source transformation for compiler optimization for one or more many integrated core (MIC) coprocessors, comprising:

identifying data dependencies in one or more candidate loops and data elements used in each iteration for one or more arrays;

profiling the one or more candidate loops to find a proper number m, wherein data transfer and computation for m iterations take an equal amount of time;

creating an outer loop outside the candidate loop, wherein each iteration of the outer loop executes m iterations of the candidate loop; and performing data streaming, wherein the data streaming comprises:
  determining optimum buffer size for one or more arrays, and inserting code before the outer loop to create one or more optimum sized buffers;
  overlapping data transfer between one or more central processing units (CPUs) and the MICs with the computation to hide data transfer overload;
  reusing the buffers to reduce memory employed on the MICs during the data transfer; and
  reusing threads on the MICs to repeatedly launch kernels on the MICs for asynchronous data transfer.

2. The method as recited in claim 1, further comprising executing code segments on the MICs when an entire data set is too large to be held in memory of the MICs.

3. The method as recited in claim 1, wherein data is transferred in a plurality of small blocks, the small blocks being smaller than an entire chunk of the data.

4. The method as recited in claim 1, wherein code is inserted before the outer loop to asynchronously copy a first segment of an array to a first MIC buffer.

5. The method as recited in claim 1, further comprising inserting code to free all buffers after the outer loop.

6. The method as recited in claim 1, further comprising:
  enabling direct memory access for transferring pointer-based structures between the CPU and the MIC; and
  optimizing memory utilization of the MIC by allocating free memory space on the MIC for other use when a data structure size is smaller than memory space on the MIC, and employing all memory space on the MIC when a data structure size approaches the memory space on the MIC.

7. A method for source-to-source transformation for compiler optimization for one or more many integrated core (MIC) coprocessors, comprising:
  regularizing irregular memory on a loop head of a candidate loop by reordering computations, and adjusting array access according to the regularized irregular memory to enable data streaming and vectorization on the one or more MICs during data transfer;
  identifying all irregular memory array accesses in a candidate loop that do not use a loop index i as an array index;
  regularizing irregular memory array accesses automatically, wherein array indices employed in all memory access is set to the loop index i;
  hiding regularization overhead by overlapping regularization with the data transfer and the computations when data streaming is employed;
  determining optimum buffer size for one or more arrays, and inserting code before an outer loop outside the candidate loop to create one or more optimum sized buffers;
  overlapping data transfer between one or more central processing units (CPUs) and the MICs with a computation to hide data transfer overload;
  reusing the buffers to reduce memory employed on the MICs during the data transfer; and
  reusing threads on the MICs to repeatedly launch kernels on the MICs for asynchronous data transfer.

8. The method as recited in claim 7, wherein the candidate loop is split into a first and a second loop, wherein irregular accesses are split into the first loop, and regular accesses are split into the second loop.

9. The method as recited in claim 8, wherein the data streaming and vectorization is performed on the second loop after the candidate loop is split.

10. The method as recited in claim 7, further comprising creating threads on a central processing unit (CPU) to perform operations in parallel with the candidate loop.

11. The method as recited in claim 7, further comprising:
  enabling direct memory access for transferring pointer-based structures between a CPU and the MIC; and
  optimizing memory utilization of the MIC by allocating free memory space on the MIC for other use when a data structure size is smaller than memory space on the MIC, and employing all memory space on the MIC when a data structure size approaches the memory space on the MIC.

12. A system for source-to-source transformation for compiler optimization for one or more many integrated core (MIC) coprocessors, comprising:
  an identification module configured to identify data dependencies in one or more candidate loops and data elements used in each iteration for one or more arrays;
  a profiling module configured to profile the one or more candidate loops to find a proper number m, wherein data transfer and computation for m iterations take an equal amount of time;
  a loop creation module configured to create an outer loop outside the candidate loop, wherein each iteration of the outer loop executes m iterations of the candidate loop;
  a data streaming module configured to perform data streaming, wherein the data streaming comprises:
    determining optimum buffer size for one or more arrays, and inserting code before the outer loop to create one or more optimum sized buffers;
    overlapping data transfer between one or more central processing units (CPUs) and the MICs with the computation to hide data transfer overload;
    reusing the buffers to reduce memory employed on the MICs during the data transfer; and
    reusing threads on the MICs to repeatedly launch kernels on the MICs for asynchronous data transfer.

13. The system as recited in claim 12, further comprising executing code segments on the MICs when an entire data set is too large to be held in memory of the MICs.

14. The system as recited in claim 12, wherein data is transferred in a plurality of small blocks, the small blocks being smaller than an entire chunk of the data.

15. The system as recited in claim 12, wherein code is inserted before the outer loop to asynchronously copy a first segment of an array to a first MIC buffer.

16. The system as recited in claim 12, wherein code is inserted to free all buffers after the outer loop.

17. The system as recited in claim 12, wherein direct memory access is employed to transfer pointer-based structures between the CPU and the MIC, and memory utilization of the MIC is optimized by allocating free memory space on the MIC for other use when a data structure size is smaller than memory space on the MIC, and employing all memory space on the MIC when a data structure size approaches the memory space on the MIC.

* * * * *